(12) United States Patent
Matsui et al.

(10) Patent No.: US 6,993,211 B2
(45) Date of Patent: Jan. 31, 2006

(54) CODE READER

(75) Inventors: Akira Matsui, Hino (JP); Seiji Tatsuta, Hachioji (JP)

(73) Assignee: Olympus Corporation, Tokyo (JP)

( * ) Notice: Subject to any disclaimer, the term of this patent is extended or adjusted under 35 U.S.C. 154(b) by 17 days.

(21) Appl. No.: 10/855,586

(22) Filed: May 26, 2004

(65) Prior Publication Data

US 2004/0251306 A1    Dec. 16, 2004

Related U.S. Application Data

(63) Continuation of application No. PCT/JP02/12327, filed on Nov. 26, 2002.

(30) Foreign Application Priority Data

Nov. 28, 2001    (JP)    ............................. 2001-362796

(51) Int. Cl.
 *G06K 9/20*    (2006.01)
(52) U.S. Cl. ...................... 382/321; 382/140; 235/454; 235/446; 235/494; 369/14; 250/557
(58) Field of Classification Search ................ 382/140, 382/321

See application file for complete search history.

(56) References Cited

U.S. PATENT DOCUMENTS

| | | | |
|---|---|---|---|
| 4,734,566 A | 3/1988 | Senda et al. | |
| 5,724,364 A | 3/1998 | Mori et al. | |
| 5,825,947 A * | 10/1998 | Sasaki et al. ................ | 382/321 |
| 5,866,895 A | 2/1999 | Fukuda et al. | |
| 5,896,403 A | 4/1999 | Nagasaki et al. | |
| 5,898,166 A * | 4/1999 | Fukuda et al. ............... | 235/494 |
| 5,943,448 A | 8/1999 | Tatsuta | |
| 6,052,813 A | 4/2000 | Nagasaki et al. | |
| 6,058,498 A * | 5/2000 | Nagasaki et al. ........... | 714/752 |
| 6,219,460 B1 | 4/2001 | Tatsuta | |
| 6,297,890 B1 * | 10/2001 | Fukuda et al. ............... | 358/1.9 |
| 6,331,901 B1 * | 12/2001 | Fukuda et al. ............... | 358/1.2 |
| 6,364,209 B1 * | 4/2002 | Tatsuta et al. ............... | 235/494 |
| 6,408,106 B1 * | 6/2002 | Tatsuta et al. ............... | 382/287 |

FOREIGN PATENT DOCUMENTS

| | | |
|---|---|---|
| JP | 56-60977 A | 5/1981 |
| JP | 61-190673 A | 8/1986 |
| JP | 6-231466 A | 8/1994 |
| JP | 9-179930 A | 7/1997 |

* cited by examiner

*Primary Examiner*—Samir Ahmed
*Assistant Examiner*—Anand Bhatnagar
(74) *Attorney, Agent, or Firm*—Frishauf, Holtz, Goodman & Chick, P.C.

(57) ABSTRACT

A parameter setting section sets a parameter stored beforehand in a parameter storage section as a parameter in an operation in an image pick-up section or an image processing section until an image pick-up start detection section detects an image pick-up start of a code. Moreover, when the image pick-up start detection section detects the image pick-up start of the code, the parameter setting section changes the parameter extracted from image information output from the image pick-up section or image information subjected to predetermined image processing in the image processing section from the parameter stored in the parameter storage section.

10 Claims, 8 Drawing Sheets

Luminance maximum value of each sub-frame

Binarizing threshold value of each sub-frame

Luminance maximum value of each sub-frame

Binarizing threshold value of each sub-frame

CODE READER

CROSS-REFERENCE TO RELATED APPLICATIONS

This is a Continuation Application of PCT Application No. PCT/JP02/12327, filed Nov. 26, 2002, which was not published under PCT Article 21(2) in English.

This application is based upon and claims the benefit of priority from prior Japanese Patent Application No. 2001-362796, filed Nov. 28, 2001, the entire contents of which are incorporated herein by reference.

BACKGROUND OF THE INVENTION

1. Field of the Invention

The present invention relates to a code reader for reading a code from a recording medium on which sound data, image data, text data, or data that can be handled by a computer is recorded as an optically readable code to restore the data.

2. Description of the Related Art

A system in which digital data is divided into block units each including a predetermined information amount, recorded on a recording medium, and reproduced is disclosed in U.S. Pat. No. 5,866,895. In this system, each divided block data is read together with address data, and block data is combined based on an address to reproduce information. A configuration in which the data is divided into blocks, recorded, and reproduced in this manner is superior in expandability of data and reading flexibility, and even the data which cannot be stored in an image pickup screen is readable by scanning the code.

Furthermore, it is proposed in U.S. Pat. No. 5,724,364 that luminance information extracted from continuously picked-up frame images be fed back to a quantity of illuminative light or binarizing threshold value setting for the next frame image pick-up. In this system, an optimum quantity of illuminative light or binarizing threshold value can be set following luminance changes of an ever-changing code image during code scanning, and therefore the system is superior in that read defects are reduced.

BRIEF SUMMARY OF THE INVENTION

According to an aspect of the present invention, there is provided a code reader to optically read a code from a recording medium on which data is recorded as an optically readable code, comprising:

an image pick-up section configured to continuously pick up an image of the code, while relatively moving with respect to the recording medium, to output image information in a time series every image pick-up;

an image processing section configured to subject the image information output from the image pick-up section to predetermined image processing;

a data read section configured to read the data from the image information subjected to the predetermined image processing in the image processing section;

an image pick-up start detection section configured to detect image pick-up start of the code by the image pick-up section based on one of the image information output from the image pick-up section and the image information subjected to the predetermined image processing in the image processing section;

a parameter storage section configured to store a parameter in an operation in one of the image-pick-up section and the image processing section before image pick-up start of the code is detected by the image pick-up start detection section; and a parameter changing section configured to change the parameter in the operation in one of the image pick-up section and the image processing section to a parameter extracted from one of the image information output from the image pick-up section and the image information subjected to the predetermined image processing in the image processing section from the parameter stored in the parameter storage section, when the image pick-up start of the code is detected by the image pick-up start detection section.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described hereinafter with reference to the drawings.

[First Embodiment]

It is known in U.S. Pat. No. 6,052,813 and the like that various data including sound data, video data, text data or the like is encoded, presence/absence of dots is defined in accordance with "1" or "0" of the encoded data, and a dot code obtained by arranging these dots in accordance with a predetermined format is optically readably recorded in a recording medium formed of paper, plastic, metal or the like.

Figure 1:
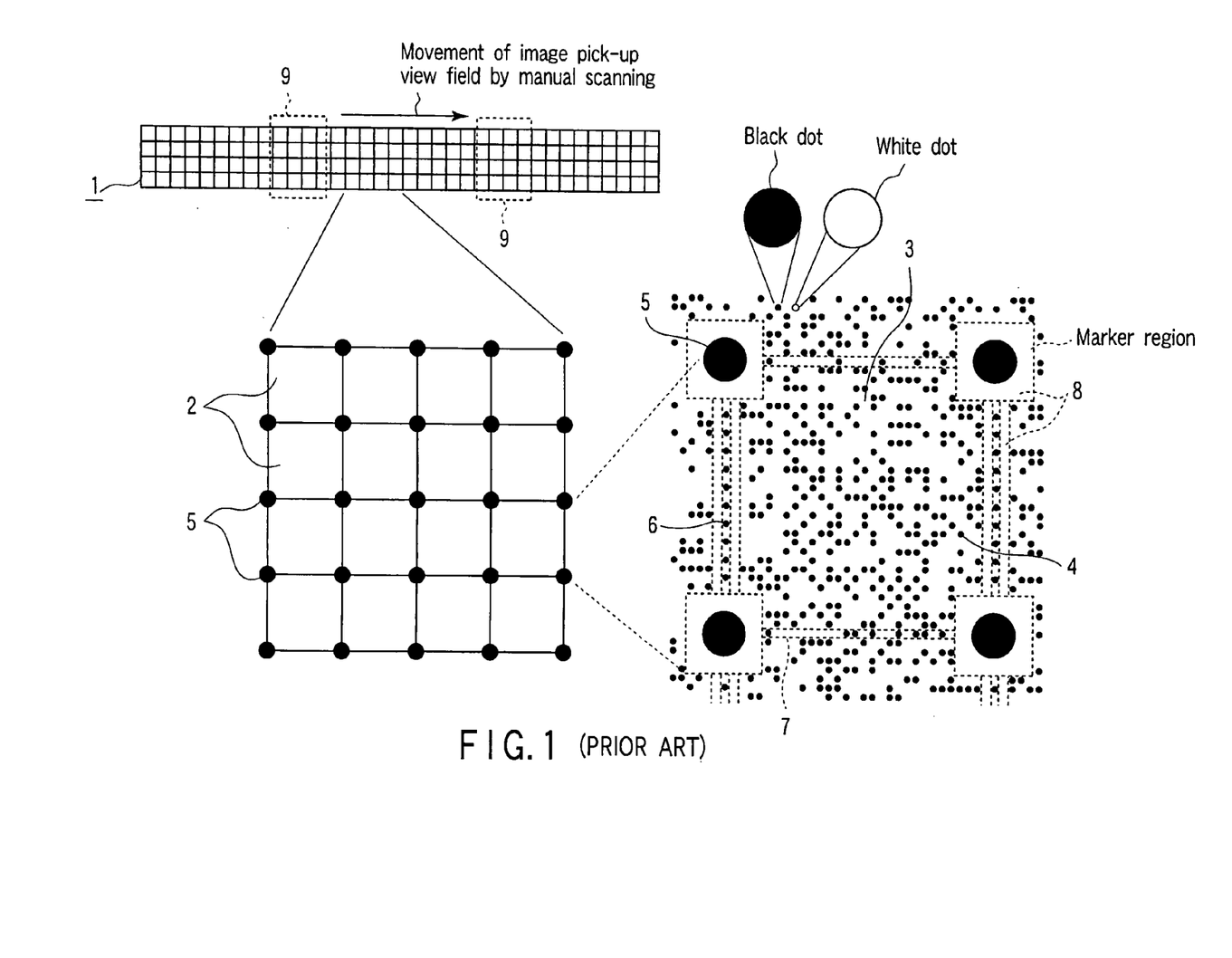
FIG. 1 is a diagram showing a physical format configuration of a dot code as an example of a code read by a code reader according to a first embodiment.

A physical format configuration of the dot code is shown in FIG. 1.

That is, a dot code 1 is configured by two-dimensionally arranging a plurality of blocks 2 adjacent to one another.

Moreover, each block 2 includes a data dot pattern region 3 in which dot images of black dots or white dots (the white dots of FIG. 1 correspond to a color of a recording medium itself) exist in a predetermined two-dimensional arrangement in accordance with "1" or "0" or data divided for each block of the recorded data. Furthermore, each block 2 includes: a marker region including a certain number of consecutive black markers 5 arranged in four corners of each block 2 for use in finding out read reference points for reading each data (data dots 4) in the data dot pattern region 3; pattern dots 6 which is a set of isolated dots arranged between the markers 5 for use in finding the read reference points with a further good precision; and block address patterns 7 (block ID region) including error detection or error correction codes similarly arranged between the markers 5 in order to identify each block 2. It is to be noted that peripheries of the markers 5 and pattern dots 6 are dot non-arranged areas 8 which are all white regions in order to facilitate the detection of the peripheries.

Thereafter, according to the dot code 1, even when a size of the whole dot code 1 is larger than that of an image pick-up view field 9 of a reader, in other words, even when the image of the dot code 1 cannot be picked up by the reader in one shot, each address attached to each block 2 is detected by a block unit together with the data dots 4 included in a block. Then, data included in each block 2 can be collected to reconstruct original whole data. Therefore, it is also possible to record data having a large capacity, such as sound with respect to a sheet surface, and the data can be easily read even by manual scanning.

Figure 2:
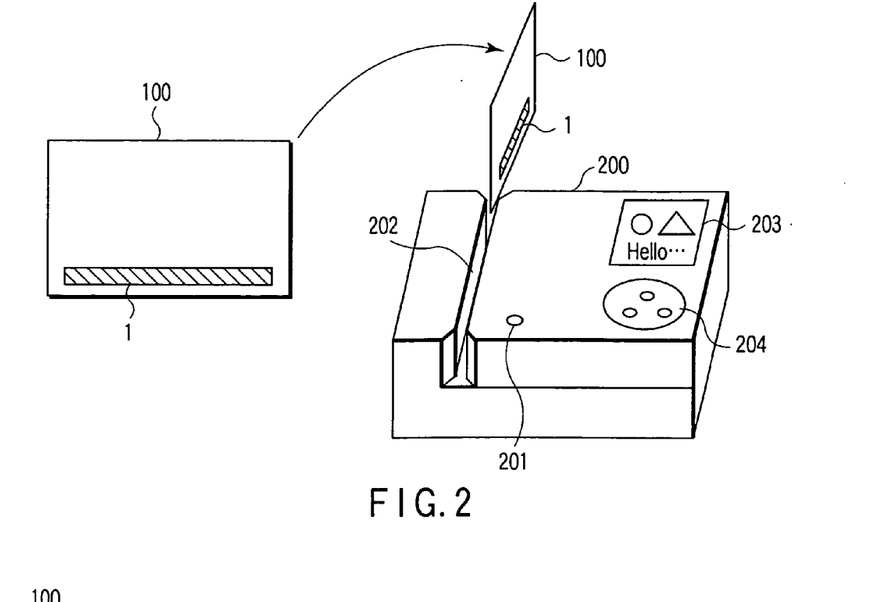
FIG. 2 is a perspective view showing appearances of a card as a recording medium on which the dot code is recorded, and a code reader according to a first embodiment, which is a card reader for reading the dot code.

FIG. 2 is a perspective view showing appearances of a card 100 as a recording medium on which the dot code 1 is recorded, and a code reader 200 according to a first embodiment of the present invention, which is a card reader for reading the dot code 1.

Here, the dot code 1 is recorded along a predetermined side of the card 100. In the code reader 200, after a read start switch (SW) 201 is pressed, the predetermined side of the card 100 is allowed to abut on a bottom surface of a guide groove (slit 202) which is a scanning guide, and the card 100 is manually moved (pulled), for example, in a side direction toward front from an inner side of a screen along the slit 202.

Accordingly, the dot code 1 is read by image pick-up devices such as a CCD (not shown) disposed in the slit 202 of the code reader 200, and data such as video, sound, and text recorded as the dot code 1 is displayed in a display section 203 comprising an LCD, or output from a speaker 204.

Figure 3:
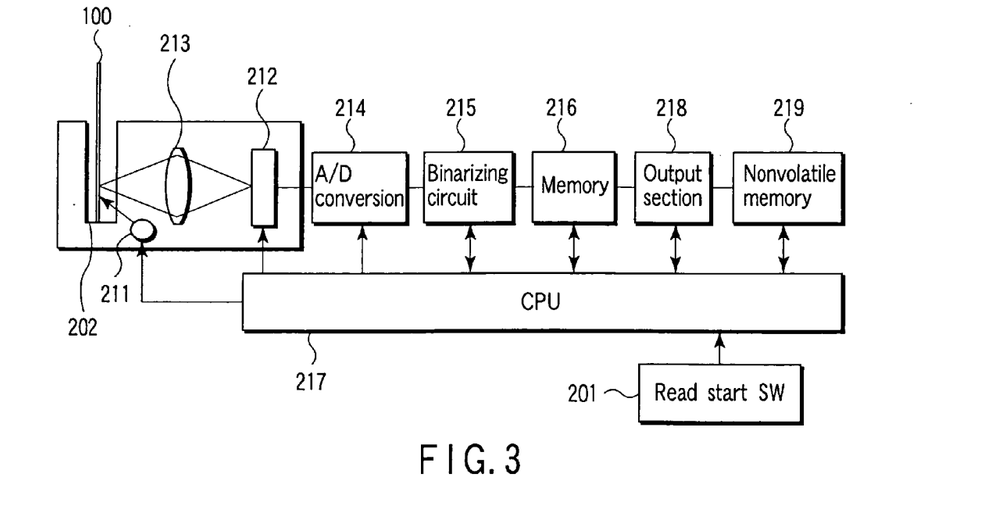
FIG. 3 is a block diagram of the code reader according to the first embodiment.

FIG. 3 is a block diagram of the code reader 200 according to the first embodiment. The code reader 200 comprises: illumination 211; an image pick-up element 212; an image forming lens 213; an A/D conversion circuit 214; a binarizing circuit 215; a memory 216; a CPU 217; an output section 218; and a nonvolatile memory 219. The illumination 211 includes an LED and the like for illuminating the dot code 1. The image pick-up element 212 comprises a CCD or an MOS image sensor. The image forming lens 213 forms an image of the dot code 1 illuminated by the illumination 211 on the image pick-up element 212. The A/D conversion circuit 214 converts an analog signal of an image obtained by the image pick-up element 212 into a digital signal. The binarizing circuit 215 binarizes the image. The memory 216 is used as a frame memory for storing the image or a work area of the CPU 217. The CPU 217 reads block data from binarized code image, restores recorded original information such as sound and video from the read block data, and controls the whole device. The output section 218 comprises the display section 203, speaker 204 and the like. The nonvolatile memory 219 comprises a flash memory and the like, and an operation parameter of the code reader 200 is stored.

Figure 4:
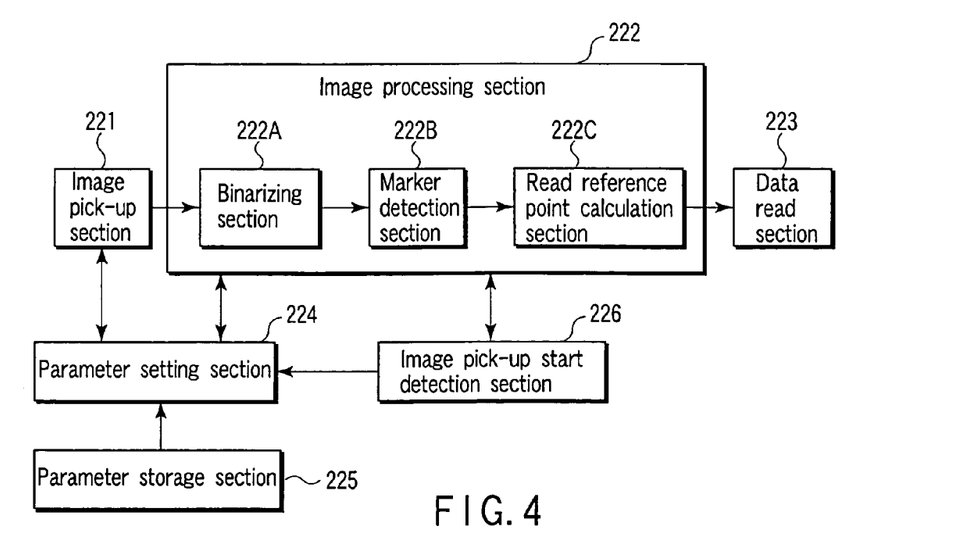
FIG. 4 is a function block diagram of the code reader according to the first embodiment of the present invention.

Moreover, FIG. 4 shows a function block diagram of the code reader 200. That is, the code reader 200 functionally comprises: an image pick-up section 221; an image processing section 222; a data read section 223; a parameter setting section 224 (corresponding to a parameter changing section described in claims); a parameter storage section 225; and an image pick-up start detection section 226.

Here, the image pick-up section 221 is realized by the illumination 211, image pick-up element 212, and image forming lens 213. The image pick-up section 221 continuously picks up the image of the code to output image information corresponding to each image pick-up in a time series.

Moreover, the image processing section 222 is realized by the A/D conversion circuit 214, binarizing circuit 215, memory 216, and CPU 217. The image processing section 222 includes a binarizing section 222A, a marker detection section 222B, and a read reference point calculation section 222C, and processes the image picked up by the image pick-up section 221 to calculate the read reference points for reading the data recorded in the dot code 1.

Here, each operation of these constituting elements included in the image processing section 222 will be described. The binarizing section 222A binarizes each sub-frame with a threshold value set for each sub-frame obtained, for example, by dividing the image pick-up view field (frame) into 12. The marker detection section 222B detects the markers 5 configuring the reference points for reading the data from the binarized image. As a method of detecting the markers 5, a known method is usable, for example, in which an image is raster-scanned to detect a black column having a predetermined length. In the read reference point calculation section 222C, a coordinate of the markers 5 indicating four corners of the block detected by the marker detection section 222B is detected by using the pattern dots 6 and is set as the read reference points. Details of the setting of the read reference points are described in detail in the U.S. Pat. No. 5,866,895.

Next, in the data read section 223 realized by the CPU 217, pixels on lattice points obtained by dividing lattices between the coordinates of the markers 5 indicating four corner of the block 2 calculated by the read reference point calculation section 222C are read as data. For example, the data is read as "1", "0" in accordance with "black", "white" of the pixel.

The parameter setting section 224 realized by the CPU 217 sets parameters which define operations of the image pick-up section 221 and image processing section 222. Concretely, a quantity of emitted light of the LED for illumination (illumination 211) of the image pick-up section 221, and a binarizing threshold value of the binarizing section 222A are set.

The parameter storage section 225 comprises the non-volatile memory 219 such as a flash memory, and initial parameters described later are stored for use in the image pick-up section 221 and image processing section 222.

The image pick-up start detection section 226 realized by the CPU 217 detects whether or not a desired pattern is included in the processed image, for example, whether or not the image of the dot code 1 has been picked up based on a processing result of the image processing section 222 to inform the parameter setting section 224 of the result.

Figure 5:
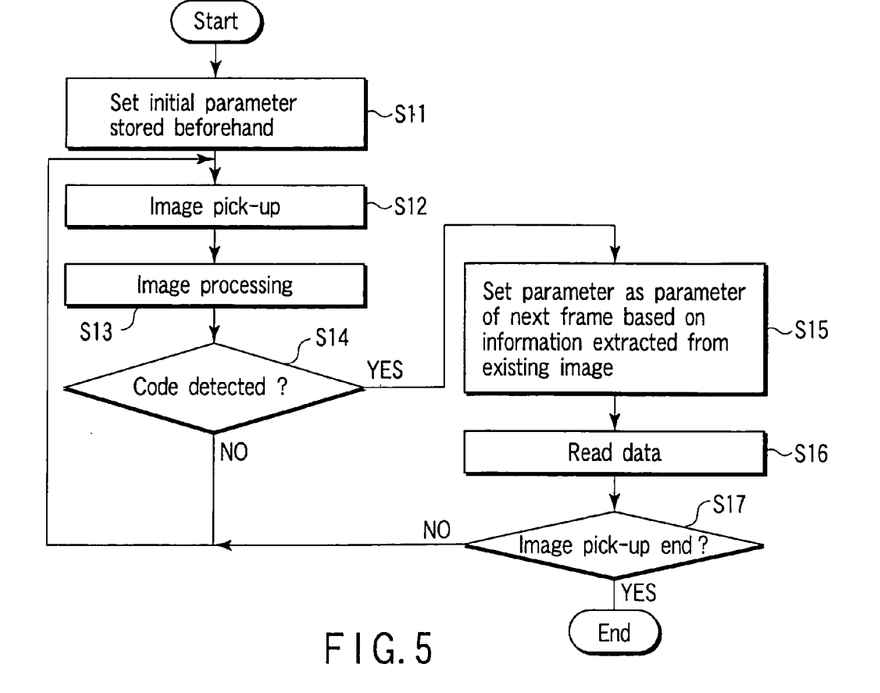
FIG. 5 shows an operation flowchart of the code reader according to the first embodiment.

An operation of the code reader 200 will be described with reference to an operation flowchart shown in FIG. 5.

First, when image pick-up start is instructed by the read start SW 201, the parameter setting section 224 sets the initial parameters stored in the parameter storage section 225 into the image pick-up section 221 and the image processing section 222 (step S11). Here, the initial parameters are parameters for controlling the operations of the image pick-up section 221 and image processing section 222, and include an initial quantity of emitted light of the LED for illumination of the image pick-up section 221, and the binarizing threshold value in the binarizing section 222A included in the image processing section 222. It is to be noted that since the quantity of emitted light of the LED is controlled by an emission time (pulse width), the initial quantity of emitted light is actually an emission pulse width.

Values of these initial parameters are calculated from emission efficiency or light distribution pattern of the LED for illumination (illumination 211), characteristics of hardware configuring the code reader 200 such as sensitivity characteristics of the image pick-up element 212 and optical characteristics of the image forming lens 213, and/or characteristics on a medium side such as a reflectance of a medium on which the dot code 1 to be read is stored and a concentration of the dot code 1. The values are predetermined so as to indicate adequate values which do not cause any reading defect, when the image of the dot code 1 is picked up in a screen.

Figure 6:
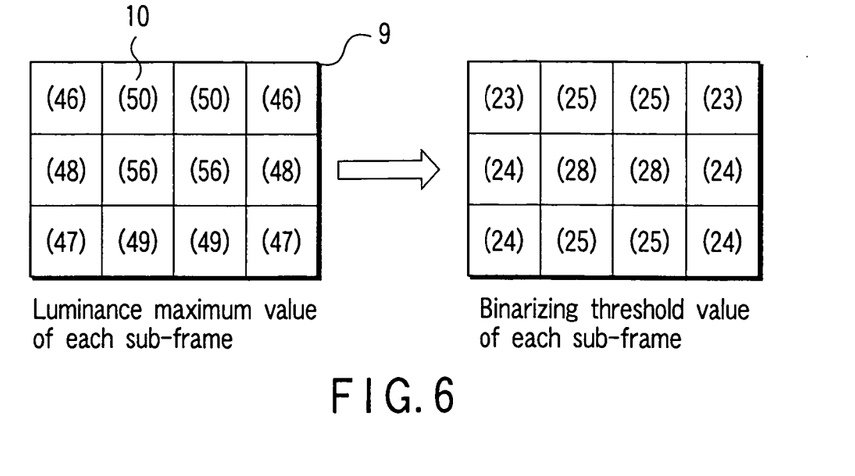
FIG. 6 is a diagram showing examples of a luminance maximum value and a binarizing threshold value of each sub-frame.

For example, when the images of the mediums such as paper and card having a uniform reflectance of the same degree as that of the white dot of the dot code, as shown on the left side of FIG. 6, the quantity of emitted light of the LED is adjusted in such a manner that a luminance maximum value of all sub-frames 10 is not less than a predetermined value. In this example, a luminance value of a darkest portion of the screen sub-frame 10 is adjusted to be not less than "46", and the LED emission pulse width at this time is obtained as an initial quantity of illuminative light. Furthermore, the binarizing threshold value is calculated in accordance with the luminance maximum value of each sub-frame 10 at this time as shown in the right side of the figure, and is determined as an initial binarizing threshold value.

The initial binarizing threshold value is set based on a luminance in each portion of the image pick-up screen at a time when a predetermined quantity of light is emitted, and accordingly it is possible to perform appropriate reading while shading caused by illumination unevenness of the LED, peripheral reduced light of the image forming lens or the like is corrected. It is to be noted that here the binarizing threshold value of each sub-frame is stored, but the maximum value of the luminance of each sub-frame at the time of the emission of the initial quantity of illuminative light may be stored beforehand, and the binarizing threshold value may be calculated from the maximum value of the luminance at a code reading time.

Next, the image pick-up section 221 emits the quantity of emitted light of the LED for illumination set by the parameter setting section 224 to pick up the image (step S12). The picked-up image is subjected to image processing such as binarizing, marker detection, and detection of the read reference points in the image processing section 222 (step S13). At this time, in the binarizing section 222A, as shown in FIG. 6, the binarizing is performed with the threshold value set beforehand for each sub-frame 10 obtained by dividing the image pick-up screen (frame) into 12. At this time, in parallel with the binarizing, a maximum luminance is extracted as a characteristic amount for each sub-frame 10.

Next, the image pick-up start detection section 226 judges whether or not the image of the dot code 1 is picked up in the image pick-up screen based on information processed by the image processing section 222 (step S14). Concretely, for example, when the marker detection section 222B detects the markers 5, it is judged that the image of the dot code 1 is picked up. It is possible to judge whether or not the image of the dot code 1 has been picked up based on predetermined information processed in the image processing section 222 in addition to the detection of the markers 5. For example, from when the image pick-up starts until the image of the dot code 1 (card 100) is picked up, the image inside the slit 202 having a low reflectance is picked up. Therefore, the luminance of the screen is very low, but the luminance of the screen rapidly increases at a time when the image of the dot code 1 is picked up. Using this, the judgment can be performed, when the maximum luminance value of each sub-frame 10 extracted in the binarizing section 222A reaches a predetermined value. Needless to say, it is also possible to perform the judgment directly using the output from the image pick-up section 221.

As a result of the judgment performed in this manner, unless the dot code 1 is detected, the process returns to the image pick-up of the next frame (step S12).

On the other hand, when it is judged that the dot code 1 has been detected, the parameter setting section 224 changes/sets the quantity of emitted light of the LED and the binarizing threshold value in the binarizing section 222A for obtaining an optimum image pick-up state as the parameter for the next frame image pick-up based on the luminance information of each sub-frame 10 extracted by the binarizing section 222A (step S15). Subsequently, the data read section 223 reads the block data (step S16).

Subsequently, it is judged whether or not the image pick-up has been finished (step S17). If the image pick-up has not been finished yet, the process returns to the step S12 to perform the image pick-up and image processing of the next frame with the parameter changed/set in the step S15.

It is to be noted that the threshold value in binarizing (n+1) frames in the binarizing section 222A of the image processing section 222 is determined based on luminance information of n frames. That is, there is a delay of one frame, but there is no rapid change of luminance between the consecutive frames during the image pick-up of the dot code 1, and therefore no problem is raised. If the image is to be binarized using the luminance information of the picked-up image, the image is accessed once in order to obtain the luminance information of the image, and subsequently the image is accessed again for the binarizing based on the information. That is, one image needs to be accessed twice. To avoid this, the luminance information is extracted in parallel with the binarizing of the previous frame, and the luminance information is used in binarizing the next frame.

Moreover, the end of the image pick-up can be judged depending on whether or not the image of the dot code 1 has been picked up in the same manner as in the step S14. Additionally, in this case, the end of the image pick-up is not quickly judged, when any image of the dot code 1 is not picked up. Furthermore, it is important to judge the end of the image pick-up, when any image of the dot code 1 is not picked up for some frames.

Therefore, the processing ends when the image pick-up ends (step S17).

Figure 7:
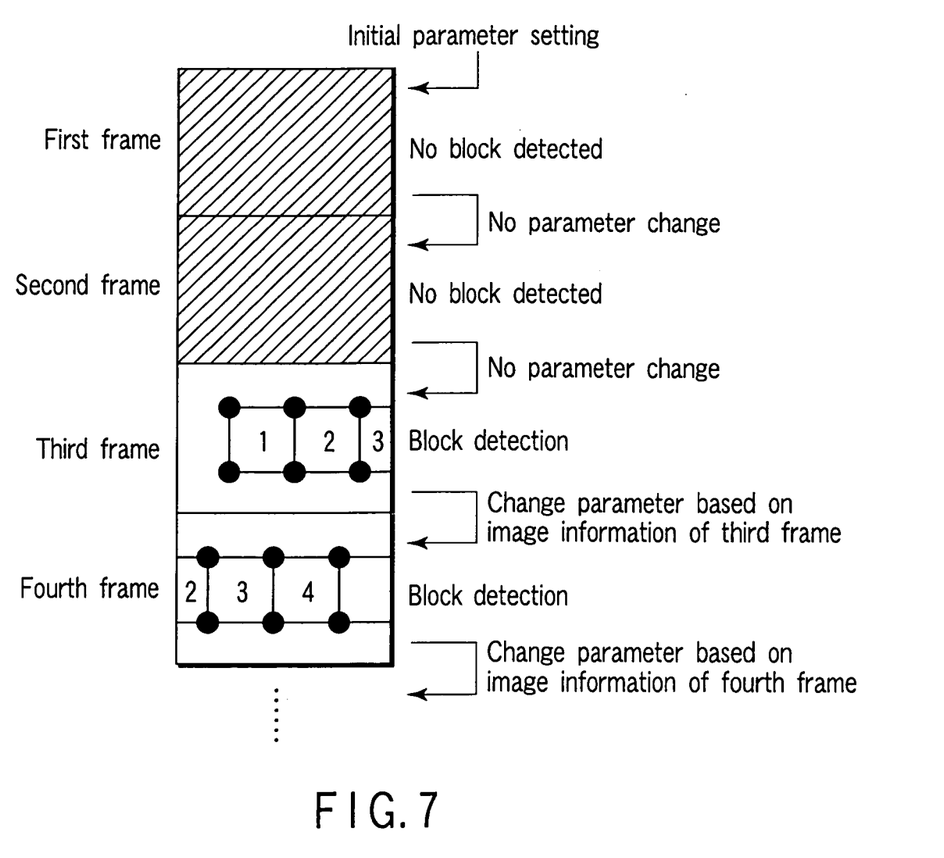
FIG. 7 is a diagram showing image pick-up examples in a plurality of frames.

An operation at a code read start time will further be described with reference to FIGS. 7 and 8. It is to be noted that in this example, the image of the dot code 1 is moved by manual scanning or the like and is continuously picked up. As shown in FIG. 7, in first and second frames, any image is not picked up immediately after the image pick-up (the image inside the slit 202 is picked up), and a third frame is first brought into a state in which the image pick-up of the dot code 1 is started.

First, when the image pick-up is started, the image pick-up and image processing are performed with the initial parameter stored beforehand. That is, the image of the first frame is picked up with the initial quantity of LED emitted light, and the picked-up image is binarized and processed with an initial binarizing threshold value. However, since the dot code 1 is not detected in this frame, no parameter is calculated for the next frame. That is, the image of the medium on which the dot code 1 is recorded is not picked up, and therefore a luminance value extracted from the image is very low, but the parameter is not calculated based on the luminance information. Therefore, the image is picked up and processed again with the initial parameter in the subsequent second frame. Since the image of the dot code 1 is not picked up even in this frame, the parameter is not calculated.

Moreover, the image of the dot code 1 is picked up and processed first in the third frame. The parameter at this time remains to indicate the initial value, but the parameter is determined beforehand in such a manner that an adequate luminance is obtained and the binarizing is appropriately performed, when the image of the dot code 1 is picked up. Therefore, the image is picked up with an appropriate quantity of illuminative light in the third frame, and the luminance of the image is in an adequate luminance range in which any reading error is not caused, as shown in FIG. 8. Moreover, the binarizing is performed by an adequate binarizing threshold value, and thereafter the image is processed. Furthermore, since the dot code 1 is detected in this frame, the parameter for the next frame is calculated and set based on the luminance information of this frame.

Figure 8:
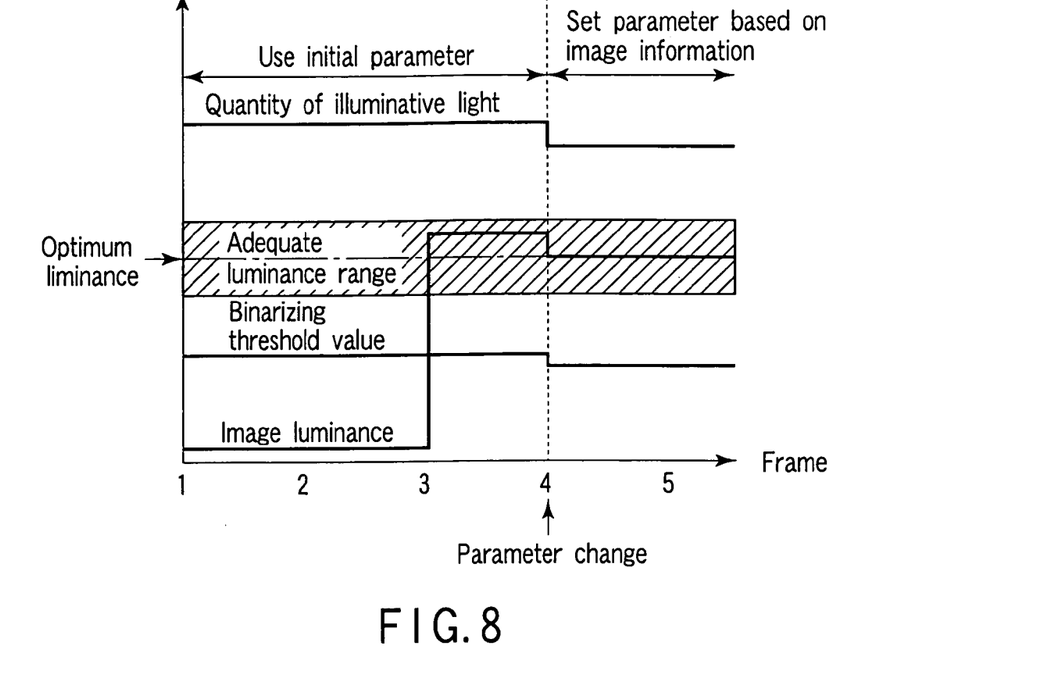
FIG. 8 shows a timing chart showing a relation between an image luminance and a parameter in a plurality of frames.

That is, in the example shown in FIG. 8, since the obtained luminance information is slightly higher than an optimum value of a middle of an adequate luminance range, the quantity of illuminative light is lowered in order to set the value to an optimum value. Moreover, the binarizing threshold value of the next frame is determined based on the luminance information of the frame. Furthermore, the block data whose block addresses are "1" and "2" is read.

Therefore, in the fourth frame, the image is picked up with the quantity of illuminative light from which an optimum luminance is obtained, and binarized with an optimum binarizing threshold value, and the block data whose block addresses are "3" and "4" is read.

In this manner, the image is picked up with the initial parameter adequately set beforehand in such a manner that a reading defect is not caused, when the image of the dot code 1 is picked up. Therefore, an inappropriate parameter can be prevented from being set based on the image information of the frame in which the image of the dot code 1 is not picked up. Therefore, the image is picked up and processed with the optimum parameter even in a case where the image of the dot code 1 is picked up instantly from a state where the image of the dot code 1 is not picked up. Therefore, it is possible to prevent the code reading defect in the read start end of the dot code 1.

Figure 9:
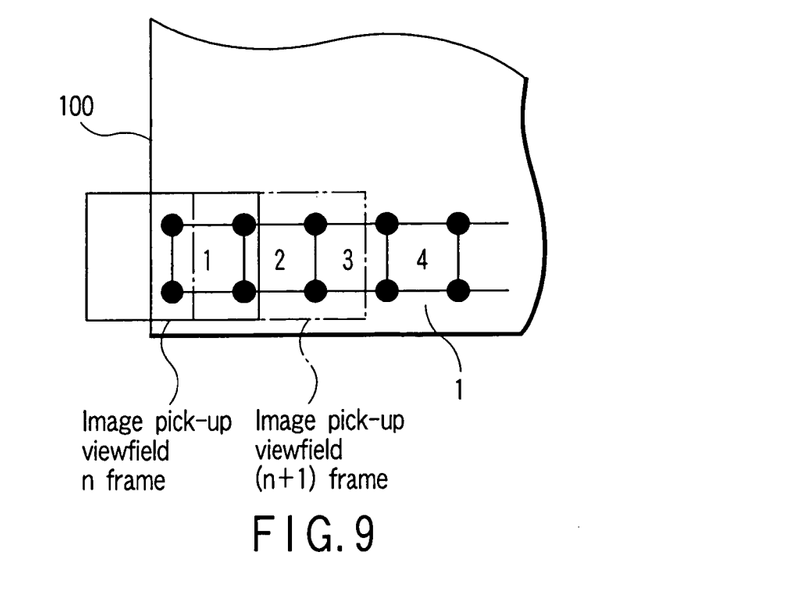
FIG. 9 is a diagram showing a card on which a block of dot codes is recorded in the very vicinity of a card end in a scanning direction.

Moreover, as shown in FIG. 9, in a case where the block 2 of the dot code 1 is recorded in the very vicinity of the card end of the scanning direction, in an n-th frame in which the dot code 1 is first detected, factors for causing incorrect parameter calculation except the card 100 and dot code 1 enter in the image pick-up view field 9. Therefore, it is undesirable to calculate the parameters based on the image information of the frame. Therefore, the judgment of code detection in step S14 of FIG. 5 is to be performed at a time when the second block is detected, that is, when the code is detected in (n+1) frame in FIG. 9. Accordingly, the factors that cause incorrect parameter calculation can be securely prevented from entering the image pick-up view field 9 at a parameter calculation time.

Figure 10A:
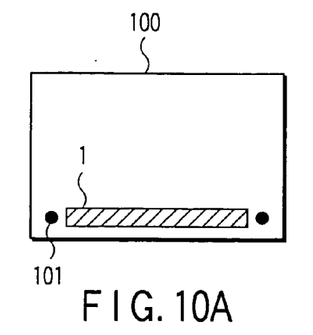
FIG. 10A is a diagram showing an example of a card on which a mark having a predetermined shape is recorded in the vicinity of a scanning start end of the dot code.
Figure 10B:
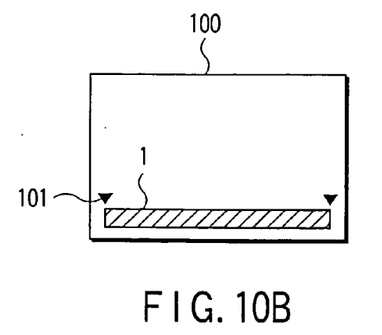
FIG. 10B is a diagram showing an example of a card on which a mark having another predetermined shape is recorded in the vicinity of the scanning start end of the dot code.
Figure 10C:
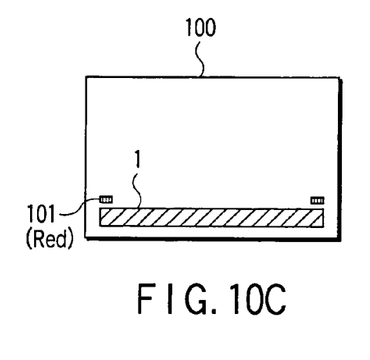
FIG. 10C is a diagram showing an example of a card on which a mark having a predetermined shape and color is recorded in the vicinity of the scanning start end of the dot code.

Moreover, in the judgment of the code detection (step S14 of FIG. 5) in the present embodiment, the dot code 1 itself is directly detected. As shown in FIGS. 10A to 10C, a state of the card, which is a recording medium, may also be detected so as to detect marks 101 recorded in the vicinity of the scanning start end of the dot code 1 and having a predetermined shape or color as a code start index. Furthermore, when the image of the dot code 1 is surely picked up following the marks 101, the initial parameter is updated based on the luminance level of the mark 101. Thereafter, the parameter may also be changed by the real dot code 1.

Moreover, to determine the initial parameter stored beforehand in the parameter storage section 225, all fluctuation factors are considered, such as a decrease of the quantity of light or a power voltage fluctuation of an apparatus by deterioration of the LED for illumination with an elapse of years, external environmental fluctuations such as humidity/humidity, and a fluctuation or the reflectance of the medium on which the dot code 1 is recorded. The initial parameter is preferably determined in a center of the fluctuation width.

Figure 11:
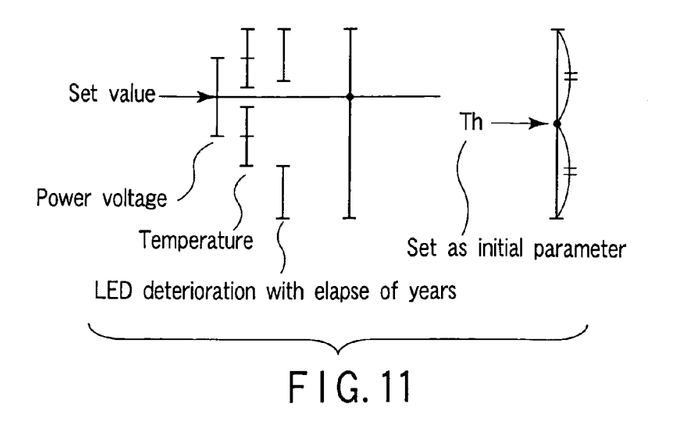
FIG. 11 is an explanatory view of determination of an initial parameter in consideration of a fluctuation factor.

For example, when the binarizing threshold value is considered, a designed value exists in an ideal state of a system comprising the dot code 1 (card 100) and code reader 200, but the value fluctuates by the power voltage, humidity, or deterioration of the LED for illumination with the elapse of years, and the optimum value of the binarizing threshold value fluctuates with a certain width in the whole system. Additionally, as shown in FIG. 11, the value fluctuates by the power voltage and temperature in both positive/negative directions, but the change of the LED for illumination with the elapse of years acts only in the negative direction, and a width of fluctuation is therefore non-symmetric. Here, an allowable amount of deviation from the initial value is generally a substantially positive/negative equal amount, and the amount sometimes exceeds the allowable amount in the negative direction. Therefore, when the initial parameter is set beforehand in the center of the fluctuation width, the deviation is set within an allowable range. Even when the fluctuations occur due to the power voltage, temperature, deterioration of the LED for illumination with the elapse of years and the like, the parameter is set in an appropriate state.

[Second Embodiment]

Next, a second embodiment of the present invention will be described.

Figure 12:
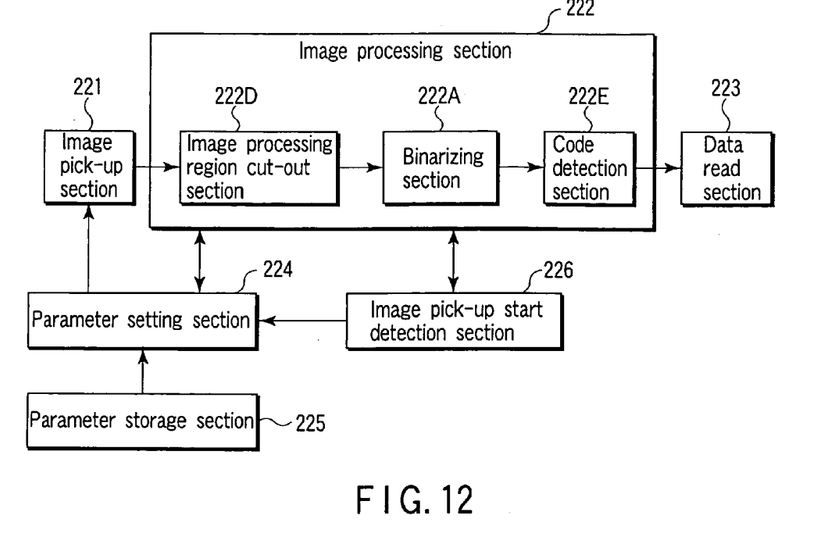
FIG. 12 is a function block diagram of the code reader according to the second embodiment of the present invention.

FIG. 12 is a function block diagram of the code reader 200 according to the present embodiment. In the code reader 200, the image processing section 222 comprises an image processing region cut-out section 222D, binarizing section 222A, and code detection section 222E.

Moreover, in the present embodiment, the parameter setting section 224 sets a cut-out start Y position and a height of an image processing region which are parameters in cutting the image processing region required for reading the code from the image pick-up view field 9 in the image processing region cut-out section 222D. The image processing region cut-out section 222D cuts the image processing region from the image pick-up view field 9 based on the set parameters. The subsequent process in the image processing section 222 is performed only in the cut-out image processing region.

The binarizing section 222A binarizes the cut-out image processing region, and the code detection section 222E detects the code and the Y position from the binarized image. For example, when the code is the dot code 1 shown in FIG. 1, the markers 5 disposed in four corners of the block 2 are detected to detect the code, and the Y position of the code can be calculated from the coordinates of the markers 5.

The data read section 223 reads the data of the code based on the detected code position.

The image pick-up start detection section 226 detects that the image of the code is picked up in the image processed by the image processing section 222 to inform the parameter setting section 224 that the image pick-up of the code is started.

The parameter storage section 225 stores the cut-out start Y position in cutting the image processing region which is a processing object out of the image pick-up view field 9, determined from the positional shift in a direction (hereinafter, the Y-direction) crossing the code scanning of the image pick-up view field described later at right angles, as an initial parameter.

Figure 13:
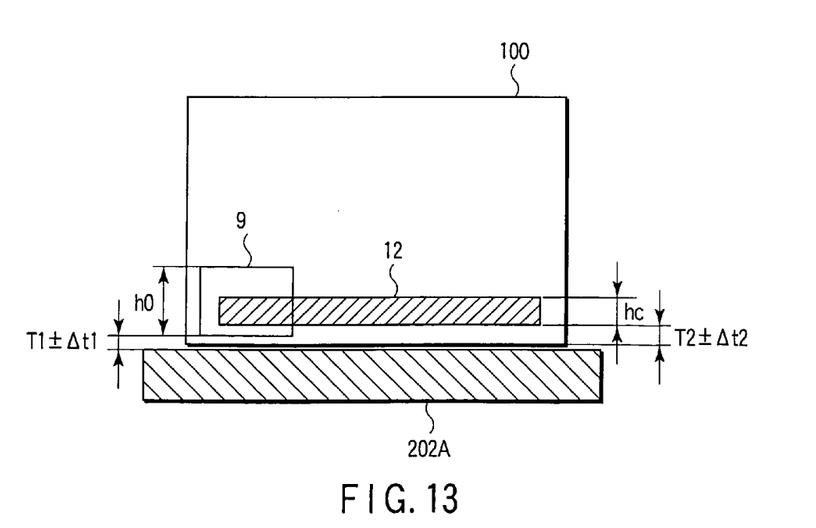
FIG. 13 is an explanatory view of a positional shift error in a Y-direction.

Here, a positional shift error of the Y-direction will be described with reference to FIG. 13.

That is, the Y position of a code 12 whose image is picked up in the image pick-up view field 9 is determined from a position T1 of the image pick-up view field 9 with respect to a scanning guide 202A comprising the bottom surface of the slit 202, an error $\pm\Delta t1$ of the position, a distance T2 between a card 100 end surface and the code 12, an error $+\Delta t2$ of the distance, a height h0 of the image pick-up view field 9, and a positional fluctuation $\pm\Delta t3$ of the Y-direction by manual vibration or the like at a card scanning time.

It is to be noted that the error of $\pm\Delta t1$ is generated by mechanical factors such as an attaching error of the image pick-up element 212, and the error $\pm\Delta t2$ is generated by a cutting error of the card 100 or an error of a recording position of the code 12.

Figure 14:
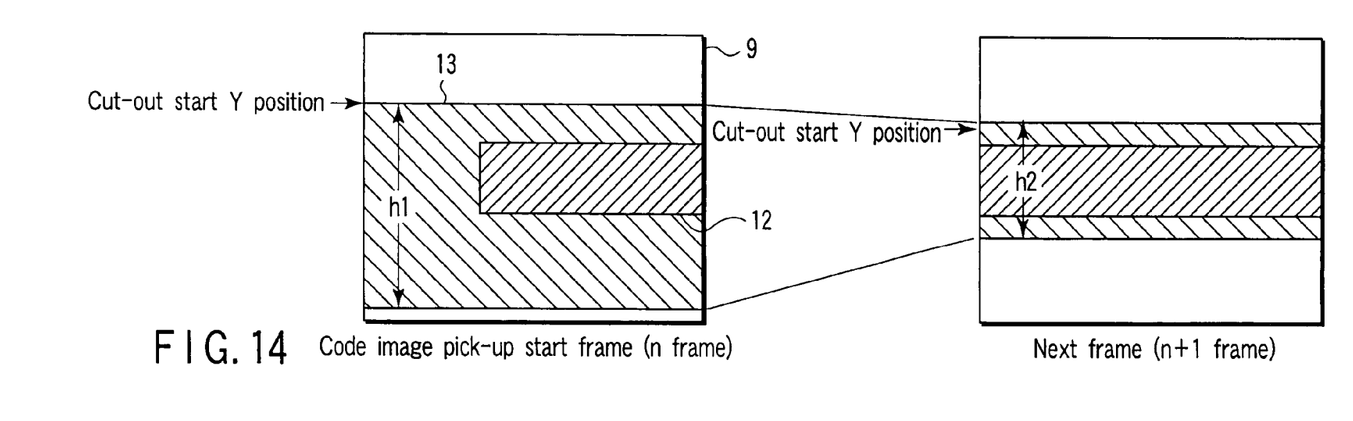
FIG. 14 is an explanatory view showing a method of setting an image processing region in the code reader according to the second embodiment.

An operation of the code reader 200 will be described with reference to FIG. 14.

That is, when the image pick-up is started, as shown on the left side in the figure, the parameter setting section 224 sets the cut-out start Y position stored in the parameter storage section 225, and a height h1 of an image processing region 13 to be cut out as the parameters of the image processing region cut-out section 222D. The height hi of the image processing region 13 is determined from a height hc of the code 12 which is known information, the error $\pm\Delta t2$ of the distance between the card end and the code 12, generated by the cutting error of the card 100, recording error of the code 12 or the like, and the positional error $\pm\Delta t3$ by the manual vibration caused at the card scanning time, and h1=hc+2×($\Delta t2+\Delta t3$). Moreover, the parameters are not changed until the image pick-up start detection section 226 detects that the image of the code 12 is picked up in the screen. Therefore, in the frames from when the image pick-up starts until the image pick-up of the code is started, a region having a height hi from the cut-out start Y position shown on the left side of the figure is cut out and processed as the image processing region 13.

Moreover, when the image pick-up start detection section 226 detects that the image of the code 12 has been picked up, the parameter setting section 224 calculates a new cut-out start Y position from the detected Y position of the code 12 and a height h2 of the image processing region 13 to be cut out as shown on the right side of the figure, and changes/sets the parameter in the image processing region cut-out section 222D. The height h2 is determined from the height hc of the code 12 which is known information, and the positional error $\pm\Delta t3$ by the manual vibration generated at the card scanning time, and h2=hc+2×$\Delta t3$.

Figure 15:
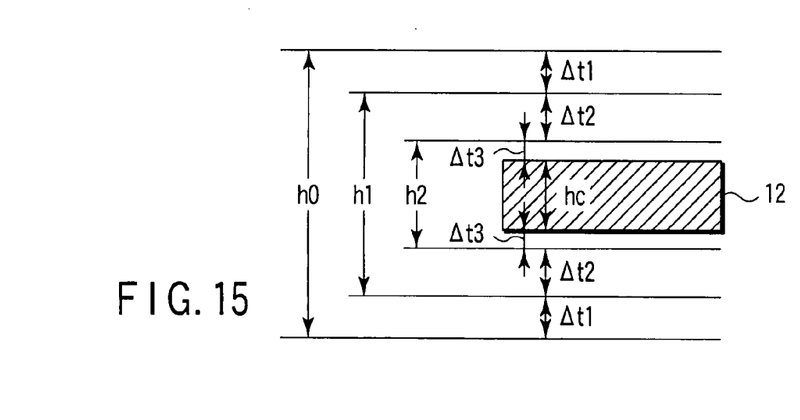
FIG. 15 is a diagram showing a relation among hc, h0, h1, h2, ±Δt1, ±Δt2, and ±Δt3.

That is, the height hc of the code 12, the height h0 of the image pick-up view field 9, the height h1 of the initially set image processing region 13, the height h2 of the image processing region 13 changed after detecting the code, the error $\pm\Delta t1$ by the mechanical factors such as an attaching error of the image pick-up element 212, the error $\pm\Delta t2$ of the distance between the card end and the code 12 generated by the cutting error of the card 100 and the recording error of the code 12, and the positional fluctuation error $\pm\Delta t3$ of the Y-direction by the manual vibration generated at the card scanning time have a relation shown in FIG. 15.

In this manner, the image processing region 13 is cut out with the cut-out start Y position and height calculated from the positional error of the image pick-up view field 9 up to a first frame in which the image of the code 12 is picked up from the image pick-up start. Therefore, the height of the image processing region 13 does not have to include any margin with respect to the positional error of the image pick-up view field 9, and the image processing region 13 which has to be processed can be narrowed. Therefore, an image processing time per frame can be reduced, and the code data can be prevented from lacking by time out in a case where the next frame processing starts before ending the reading of the code data in the screen in the code read start end. Furthermore, since the cut-out start Y position is set beforehand in accordance with the positional error of the image pick-up view field 9, mechanical errors such as the attaching error of the image pick-up element 212 for each device can be accounted for, and it is possible to reduce a mechanical attaching error.

Moreover, since the image processing region 13 is further narrowed based on the Y position of the detected code 12 after detecting the code, the image processing time per frame can be further shortened. Since the processing time per frame is shortened, a frame rate of the image pick-up element 212 can be raised to enhance a maximum scanning rate.

The present invention has been described above based on the embodiments, but the present invention is not limited to the above-described embodiments and, needless to say, various modifications or applications are possible in the scope of the present invention.

For example, in the first embodiment, the code reader for reading the dot code has been described as an example, but the present invention is similarly applicable even to a device for reading optically readable codes other than the dot code.

Moreover, in the first and second embodiments, an example in which the present invention is applied to the card reader has been described but, needless to say, the present invention is applicable even to code readers in which an operator manually scans the reader, such as a manually held pen type reader.

Furthermore, an example in which the parameter is changed for each frame after detecting the code has been described. In the card reader, the parameter does not largely fluctuate in each frame during the code image pick-up as in the manually held pen type reader. Therefore, when the parameter is changed from the initial parameter based on the detected image only once, the parameter may also be maintained in the subsequent frame.

Additionally, in either of the first and second embodiments, the parameter is changed to a parameter extracted from the image processing section, but may also be changed to a parameter directly extracted from the image processing section.

Here, the scope of the present invention is summarized as follows.

(1) A code reader to optically read a code from a recording medium on which data is recorded as an optically readable code, comprising:

an image pick-up section configured to continuously pick up an image of the code, while relatively moving with respect to the recording medium, to output image information in a time series every image pick-up;

an image processing section configured to subject the image information output from the image pick-up section to predetermined image processing;

a data read section configured to read the data from the image information subjected to the predetermined image processing in the image processing section;

an image pick-up start detection section configured to detect image pick-up start of the code by the image pick-up section based on one of the image information output from the image pick-up section and the image information subjected to the predetermined image processing in the image processing section;

a parameter storage section configured to store a parameter in an operation in one of the image pick-up section and the image processing section before image pick-up start of the code is detected by the image pick-up start detection section; and a parameter changing section configured to change the parameter in the operation in one of the image pick-up section and the image processing section to a parameter extracted from one of the image information output from the image pick-up section and the image information subjected to the predetermined image processing in the image processing section from the parameter stored in the parameter storage section, when the image pick-up start of the code is detected by the image pick-up start detection section.

That is, after detecting that the image of the code has been picked up, the parameter is changed based on the image information. Therefore, the parameter is not incorrectly changed based on undesired image information picked up until the image of the code is picked up from when the image pick-up starts, and this can prevent reading defects.

(2) The code reader according to (1), wherein the parameter in the operation in one of the image pick-up section and the image processing section is a parameter changing in accordance with a combination of characteristics of one of the recording medium and the code and characteristics of the code reader.

That is, the reading can be constantly performed with a parameter optimum for the code reader and recording medium.

(3) The code reader according to (2), wherein the parameter stored in the parameter storage section is set in consideration of one of fluctuation and deterioration of the respective characteristics.

That is, even when the characteristics of the code reader and the recording medium change by deterioration with an elapse of years, power voltage of the device, and external environment fluctuations such as temperature/humidity, stable reading is constantly possible.

(4) The code reader according to any one of (1) to (3), wherein the parameter storage section comprises a rewritable nonvolatile memory.

That is, a parameter optimum for the reading can be set beforehand in accordance with each device in a factory before shipment of the code reader.

(5) The code reader according to (1), wherein the image pick-up start detection section detects the image pick-up start by detecting that the image of the code has been picked up by the image pick-up section.

That is, since a detection object is a code itself as a reading object, the detection is facilitated.

(6) The code reader according to (1), wherein the image pick-up start detection section detects the image pick-up start by detecting a state of the recording medium.

That is, the image pick-up start can be detected by the detection of the color, specific mark or the like of the picked-up image.

(7) The code reader according to (1), wherein the image pick-up section comprises:

an illumination section configured to illuminate the code on the recording medium;

an optical system configured to form a reflected light from the recording medium illuminated by the illumination section into the image; and an image pick-up element configured to receive the light formed into the image by the optical system to output a corresponding image pick-up signal in a time series, and the parameter in the operation in the image pick-up section includes a parameter for control of a quantity of emitted light with respect to the illumination section.

That is, the quantity of illuminative light at a time when the image of the next frame is picked up can be controlled based on the picked-up image information. That is, since an optimum quantity of illuminative light can be set in accordance with an ever-changing image pick-up state, the reading defects can be reduced.

(8) The code reader according to (1), wherein the image processing section includes a binarizing section configured to binarize the image information output from the image pick-up section, and the parameter in the operation of the image processing section includes a parameter concerning a threshold value for the binarizing.

That is, since the binarizing can be performed with a threshold value optimum for the picked-up image, the code reading defects can be reduced.

(9) The code reader according to (1), wherein in the code reader, one side of a card type recording medium on which the code is recorded along a predetermined side is allowed to abut on a predetermined guide groove, and the card type recording medium is manually moved along the guide groove in a side direction to optically read the moving code, and the parameter in the operation of the image pick-up section is a parameter concerning a positional shift between the image pick-up section and the card type recording medium in a direction crossing a moving direction of the card type recording medium at right angles.

That is, since an image region required for the code image pick-up can be narrowed based on the parameter concerning the positional shift, an image data amount to be processed can be reduced to enhance a processing rate and scanning rate.

(10) The code reader according to any of (1) to (9), wherein the code comprises a plurality of blocks arranged to define a read unit of the data by the data read section.

That is, even when the whole code is not within an image pick-up screen, the block unit is read, and it is therefore possible to read the code over a plurality of divided frames.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code reader to optically read a code from a recording medium on which data is recorded as an optically readable code, comprising:
   an image pick-up section configured to continuously pick up an image of the code, while relatively moving with respect to the recording medium, to output image information in a time series every image pick-up;
   an image processing section configured to subject the image information output from the image pick-up section to predetermined image processing;
   a data read section configured to read the data from the image information subjected to the predetermined image processing in the image processing section;
   an image pick-up start detection section configured to detect image pick-up start of the code by the image pick-up section based on one of the image information output from the image pick-up section and the image information subjected to the predetermined image processing in the image processing section;
   a parameter storage section configured to store a parameter in an operation in one of the image pick-up section and the image processing section before image pick-up start of the code is detected by the image pick-up start detection section; and
   a parameter changing section configured to change the parameter in the operation in one of the image pick-up section and the image processing section to a parameter extracted from one of the image information output from the image pick-up section and the image information subjected to the predetermined image processing in the image processing section from the parameter stored in the parameter storage section, when the image pick-up start of the code is detected by the image pick-up start detection section.

2. The code reader according to claim 1, wherein the parameter in the operation in one of the image pick-up section and the image processing section is a parameter changing in accordance with a combination of characteristics of one of the recording medium and the code and characteristics of the code reader.

3. The code reader according to claim 2, wherein the parameter stored in the parameter storage section is set in consideration of one of fluctuation and deterioration of the respective characteristics.

4. The code reader according to claim 1, wherein the parameter storage section comprises a rewritable nonvolatile memory.

5. The code reader according to claim 1, wherein the image pick-up start detection section detects the image pick-up start by detecting that the image of the code has been picked up by the image pick-up section.

6. The code reader according to claim 1, wherein the image pick-up start detection section detects the image pick-up start by detecting a state of the recording medium.

7. The code reader according to claim 1, wherein the image pick-up section comprises:
   an illumination section configured to illuminate the code on the recording medium;
   an optical system configured to form a reflected light from the recording medium illuminated by the illumination section into the image; and
   an image pick-up element configured to receive the light formed into the image by the optical system to output a corresponding image pick-up signal in a time series, and
   the parameter in the operation in the image pick-up section includes a parameter for control of a quantity of emitted light with respect to the illumination section.

8. The code reader according to claim 1, wherein the image processing section includes a binarizing section configured to binarize the image information output from the image pick-up section, and
   the parameter in the operation of the image processing section includes a parameter concerning a threshold value for the binarizing.

9. The code reader according to claim 1, wherein in the code reader, one side of a card type recording medium on which the code is recorded along a predetermined side is allowed to abut on a predetermined guide groove, and the card type recording medium is manually moved along the guide groove in a side direction to optically read the moving code, and
   the parameter in the operation of the image pick-up section is a parameter concerning a positional shift between the image pick-up section and the card type recording medium in a direction crossing a moving direction of the card type recording medium at right angles.

10. The code reader according to claim 1, wherein the code comprises a plurality of blocks arranged to define a read unit of the data by the data read section.

* * * * *